(12) United States Patent
Kang et al.

(10) Patent No.: US 8,691,138 B2
(45) Date of Patent: Apr. 8, 2014

(54) INJECTION MOLDING METHOD FOR METAL-TEXTURE RESIN MOLDED ARTICLE

(75) Inventors: Myung Ho Kang, Seoul (KR); Byoung Uk Ahn, Asan-si (KR)

(73) Assignee: Myung Ho Kang (KR)

( * ) Notice: Subject to any disclaimer, the term of this patent is extended or adjusted under 35 U.S.C. 154(b) by 147 days.

(21) Appl. No.: 13/386,401

(22) PCT Filed: Jul. 2, 2010

(86) PCT No.: PCT/KR2010/004316
§ 371 (c)(1),
(2), (4) Date: Jan. 20, 2012

(87) PCT Pub. No.: WO2011/010812
PCT Pub. Date: Jan. 27, 2011

(65) Prior Publication Data
US 2012/0129992 A1    May 24, 2012

(30) Foreign Application Priority Data
Jul. 20, 2009   (KR) .................. 10-2009-0066017

(51) Int. Cl.
  *B29C 45/73*   (2006.01)
(52) U.S. Cl.
  USPC .................................................. 264/328.16
(58) Field of Classification Search
  USPC .................................................. 264/328.16
  See application file for complete search history.

(56) References Cited

U.S. PATENT DOCUMENTS

| 5,530,051 A | 6/1996 | Hirata et al. |
| 6,143,815 A | 11/2000 | Mitzutani et al. |
| 6,280,837 B1 | 8/2001 | Mitzutani et al. |
| 2008/0054529 A1* | 3/2008 | Kang ................ 264/328.16 |

FOREIGN PATENT DOCUMENTS

| JP | 2002-206053 A | 7/2002 |
| JP | 2002-212440 A | 7/2002 |
| JP | 2004-216789 A | 8/2004 |
| KR | 10-1995-0026496 A1 | 10/1995 |
| KR | 10-2004-0082930 A1 | 9/2004 |
| KR | 10-0690898 B1 | 3/2007 |
| KR | 10-0784631 B1 | 12/2007 |
| WO | 2009/029095 A1 | 3/2009 |

OTHER PUBLICATIONS

International Search Report dated Feb. 18, 2011 of PCT/KR2010/004316 which is the parent application, 3 pages.
Written Opinion dated Feb. 18, 2011 of of PCT/KR2010/004316 which is the parent application, 3 pages.

* cited by examiner

*Primary Examiner* — Jill Heitbrink
(74) *Attorney, Agent, or Firm* — Knobbe Martens Olson & Bear LLP

(57) ABSTRACT

A synthetic resin composition for metal-texture resin molded articles includes 100 parts by weight of a thermoplastic resin, 0.1 to 10 parts by weight of a plate-like metallic pigment, 1 to 50 parts by weight of a spherical glassy material and 1 to 50 parts by weight of an ultrafine filamentary material. An injection molding method for producing a metal-texture resin molded article from the synthetic resin composition and a metal-texture resin molded article molded from the synthetic resin composition are also provided.

12 Claims, 2 Drawing Sheets

INJECTION MOLDING METHOD FOR METAL-TEXTURE RESIN MOLDED ARTICLE

FIELD OF THE INVENTION

The present invention relates to a synthetic resin composition, an injection molding method and a metal-texture resin molded article. More particularly, the present invention pertains to a synthetic resin composition for metal-texture resin molded articles, an injection molding method for producing a metal-texture resin molded article from the synthetic resin composition, and a metal-texture resin molded article formed of the synthetic resin composition.

BACKGROUND OF THE INVENTION

Coating of a metallic pigment has been conventionally performed to impart metal texture to a resin molded article such as a thermoplastic resin molded article or the like. Such coating has to be carried out through complex steps including a surface cleaning step, a preliminary coating step and a drying step. An expensive apparatus is required in this coating process, which leads to an increase in process cost. In the event that detective products generated in the coating process and products collected after use are pulverized and recycled, the impact strength of recycled resins is sharply reduced and cannot be reused. Thus the detective products and the used products are disposed as wastes. This poses a problem of increased cost and environmental pollution.

As a solution to this problem, there are available different molding methods that make use of a thermoplastic resin composition containing a metallic pigment. For example, U.S. Pat. No. 6,280,837 discloses a resin molded article formed of a thermoplastic resin composition in which a brightening agent, such as an aluminum powder, a pearly mica pigment or a flaky glass powder, and a coloring agent are directly mixed with a synthetic resin. U.S. Pat. No. 6,143,815 discloses a resin molded product in which a scaly brightening agent having a particle size of 10 to 20 μm in accordance with mixed with a thermoplastic resin. U.S. Pat. No. 5,530,051 discloses a polyester-based resin molded article including metallic micro-plates having an average particle size of 80 to 800 μm and an average shape ratio of 1/100 to 1/8, the metallic micro-plates formed by cutting a metal plate to have a partial cutout portion.

In the prior art cited above, however, the metals used as the metallic pigment are not arranged in a specified direction in an injection molding process but are distributed vertically or obliquely as resin flows join each other. As a result, light is unevenly reflected only in a specific portion. This makes it impossible to obtain a uniform metal color.

In other words, as shown in FIG. 1, if a molded article is produced using a scaly or plate-like metallic pigment, the metallic pigment 100 is not oriented in a specified direction in an injection molding process. In the flow merge line where different resin flows meet each other, the metallic pigment is distributed at an angle perpendicular to or substantially perpendicular to the major surfaces of a molded article. This phenomenon occurs in the portions where the thickness of the molded article is changed. As a consequence, the reflection of light becomes uneven, which makes it impossible to obtain a uniform metal color.

In addition, the metallic pigment 100 protrudes on the product surface, thereby reducing the brightness. A plate-like aluminum pigment protruding on the product surface tends to increase friction on the product surface, consequently reducing the scratch resistance. Moreover, the metallic pigment 100 reduces the stability and durability of the product surface when exposed to a high temperature, a low temperature or ultraviolet rays. This results in a reduced lifespan of the product.

SUMMARY OF THE INVENTION

In view of the problems noted above, it is an object of the present invention to provide a synthetic resin composition for metal-texture resin molded articles capable of exhibiting a superior metal color developing property, free from color unevenness caused by a flow merge line or a flow mark and capable of preventing a metallic pigment from protruding on an article surface, an injection molding method for producing a metal-texture resin molded article from the synthetic resin composition and a metal-texture resin molded article formed of the synthetic resin composition.

According to one aspect of the present invention, there is provided a synthetic resin composition for metal-texture resin molded articles, including: 100 parts by weight of a thermoplastic resin; 0.1 to 10 parts by weight of a plate-like metallic pigment; 1 to 50 parts by weight of a spherical glassy material; and 1 to 50 parts by weight of an ultrafine filamentary material.

According to another aspect of the present invention, there is provided a injection molding method for producing a metal-texture resin molded article, including the steps of: preparing a synthetic resin composition comprising 100 parts by weight of a thermoplastic resin, 0.1 to 10 parts by weight of a plate-like metallic pigment, 1 to 50 parts by weight of a spherical glassy material and 1 to 50 parts by weight of an ultrafine filamentary material; melting the synthetic resin composition; providing a mold having a cavity; heating the mold to a temperature higher than a melting point of the synthetic resin composition; injecting the molten synthetic resin composition into the cavity of the mold; cooling the mold filled with the synthetic resin composition to solidify the synthetic resin composition; and removing the solidified synthetic resin composition from the mold.

According to a further aspect of the present invention, there is provided a metal-texture resin molded article molded from a synthetic resin composition including 100 parts by weight of a thermoplastic resin, 0.1 to 10 parts by weight of a plate-like metallic pigment, 1 to 50 parts by weight of a spherical glassy material and 1 to 50 parts by weight of an ultrafine filamentary material.

The metal-texture resin molded article according to the present invention has a uniform color and a superior outward appearance with no flow merge line and no flow mark appearing on the surface of the molded article. In addition, the present metal-texture resin molded article can solve the problem of cost increase due to the additional coating of a metallic pigment and can remove the difficulty involved in recycling the molded article.

BRIEF DESCRIPTION OF THE DRAWINGS

The above and other objects and features of the present invention will become apparent from the following description of preferred embodiments, given in conjunction with the accompanying drawings.

DETAILED DESCRIPTION OF THE PREFERRED EMBODIMENTS

Figure 1:
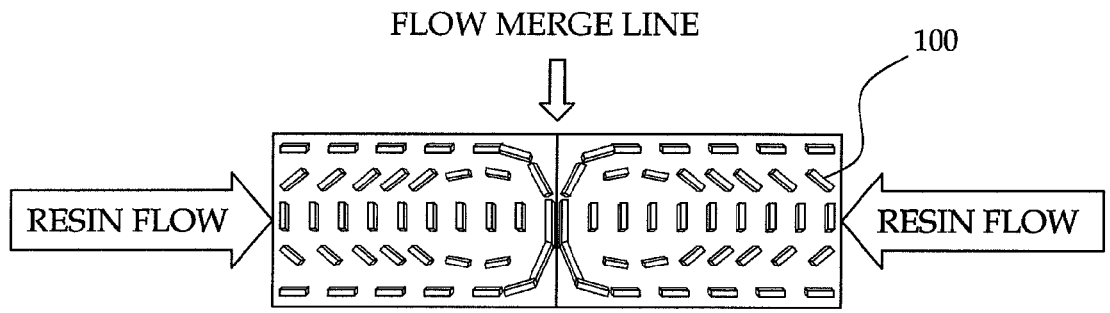
FIG. 1 is a conceptual diagram showing the arrangement of a metallic pigment in a conventional metal-texture resin molded article.

One preferred embodiment of the present invention will now be described in detail with reference to the accompanying drawings. First, description will be made on a synthetic resin composition used in an injection molding method for producing a metal-texture resin molded article according to one embodiment of the present invention.

A synthetic resin composition for metal-texture resin molded articles according to the present invention includes 100 parts by weight of a thermoplastic resin, 0.1 to 10 parts by weight of a plate-like metallic pigment having an average particle size of 20 to 200 μm, 1 to 50 parts by weight of a spherical glassy material having an average particle size of 20 to 200 μm, 1 to 50 parts by weight of an ultrafine filamentary material having an average diameter of 1 to 200 μm and an average length of 3 to 50 mm and 0.1 50 10 parts by weight of an internal lubricant. In case of the plate-like metallic pigment, the average particle size is calculated on the basis of diameters of spheres having the same surface area. In case of the ultrafine filamentary material, the average diameter denotes an average diameter on the cross section thereof. If the cross section is not circular, the average diameter signifies an average diameter of circles having the same cross-sectional area.

In the present invention, the thermoplastic resin refers to a typical thermoplastic resin well known in the art. No particular limitation is imposed on the kind of the thermoplastic resin. It is however preferred that the thermoplastic resin be selected from the group consisting of a polycarbonate resin, a polyethylene terephthalate resin, a polypropylene resin, a polyethylene resin, an acrylonitrile butadiene styrene resin, an acetal resin, a nylon resin, an EPDM (Ethylene Propylene Diene Monomer) resin, a styrene resin, a polyethylene ether ketone resin, a polyacrylate resin, a methyl methacrylate butadiene styrene resin, an acrylonitrile styrene resin, a methyl methacrylate resin and a mixture thereof.

The plate-like metallic pigment used in the present invention is not particularly limited but is preferably selected from the group consisting of gold, silver, copper, stainless steel, nickel, aluminum, titanium, tin, zinc and an alloy thereof. It is particularly preferable to use aluminum and stainless steel.

Preferably, the plate-like metallic pigment used in the present invention has an average particle size of 20 to 200 μm. If the average particle size is less than 20 μm, it is difficult to remove or reduce a flow merge line and a flow mark while it is possible to realize superior metal texture. In other words, if the average particle size is less than 20 μm, the plate-like metallic pigment is freely moved and oriented between ultrafine glass filaments having an average diameter of 15 to 20 μm. This makes it impossible to remove or reduce a flow merge line and a flow mark. If the average particle size is greater than 200 μm, the metal texture is sharply deteriorated while it is possible to remove or reduce the flow merge line and the flow mark.

The plate-like metallic pigment is added in an amount of 0.1 to 10 parts by weight based on 100 parts by weight of the thermoplastic resin. If the addition amount is less than 0.1 parts by weight, it becomes difficult to obtain desired metal texture. If the addition amount is greater than 10 parts by weight, the impact strength of the resin may be reduced.

Figure 2:
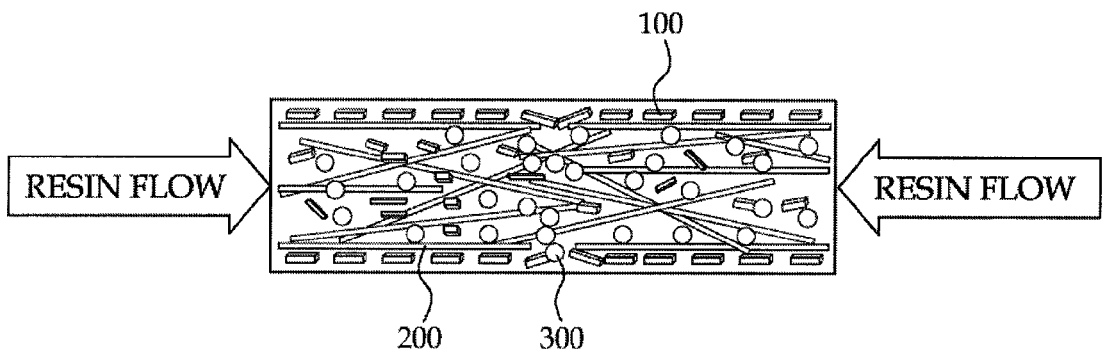
FIG. 2 is a conceptual diagram showing the arrangement of a metallic pigment, ultrafine glass filaments and a spherical glassy material in a metal-texture resin molded article according to one embodiment of the present invention.

The ultrafine filamentary material used in the present invention is mainly composed of silicon oxide and is preferably ultrafine glass filaments produced through an extrusion and elongation process. Referring to FIG. 2, ultrafine glass filaments 200 exist in a physically interlinked state near the flow merge line, thereby preventing vertical orientation of the plate-like metallic pigment 100 and removing or reducing the flow merge line. The ultrafine glass filaments are essentially colorless and have smooth glossy surfaces, thus enhancing the brightness of the metallic pigment. Use of glass filaments similar in color and coloring property to the plate-like metallic pigment helps obtain a uniform outward appearance.

The surfaces of the ultrafine glass filaments are mainly coated with a silane-based compound so that the ultrafine glass filaments can be uniformly blended within the thermoplastic resin. This assists in improving the strength of a product. Depending on the kinds of the resin used, it may be possible to use an acryl-based compound, a titanate-based compound or a zirconium-based compound.

Preferably, the ultrafine glass filaments have an average particle size of 1 to 200 μm and an average length of 3 to 50 mm. If the average particle size is less than 1 μm, the ultrafine glass filaments are not uniformly dispersed but get together. If the average particle size is greater than 200 μm, the color developing degree of the plate-like metallic pigment is reduced, which hampers realization of uniform brightness. If the average length of the ultrafine glass filaments is less than 3 mm, the physical interlinking efficiency in the flow merge line gets lowered, which makes it difficult to restrain vertical orientation of the plate-like metallic pigment. If the average length of the ultrafine glass filaments is greater than 50 mm, a problem is posed in that the flow marks of the ultrafine glass filaments appear on the surface of a product. In addition, the ultrafine glass filaments are severed in the portion near the curved surface of a product, which reduces the physical interlinking efficiency in the flow merge line.

It is preferable to add 1 to 50 parts by weight of the ultrafine glass filaments based on 100 parts by weight of the thermoplastic resin. If the addition amount of the ultrafine glass filaments is less than 1 part by weight, the physical interlinking efficiency in the flow merge line becomes insufficient. If the addition amount of the ultrafine glass filaments is greater than 50 parts by weight, the physical interlinking efficiency in the flow merge line gets enhanced but the ultrafine glass filaments hide the plate-like metallic pigment, thereby significantly reducing the brightness.

The spherical glassy material has an average particle size of 20 to 200 μm and is preferably made of a colorless transparent silicon compound. If the average particle size is less than 20 μm, the size of the spherical glassy material becomes quite smaller than the size of the plate-like metallic pigment, which reduces the effect of restraining vertical orientation of the plate-like metallic pigment. If the average particle size is greater than 200 μm, a problem is posed in that the metal texture on the outward appearance of a product becomes very coarse. Preferably, the spherical glassy material has a specific gravity of 0.1 to 0.6 g/cc. If the specific gravity is less than 0.1 g/cc, the density of the spherical glassy material grows too low and the strength thereof becomes weak. Consequently, the spherical glassy material may be broken in a resin-producing extrusion process and a product-molding injection process. If the specific gravity is greater than 0.6 g/cc, the spherical glassy material is not broken in the manufacturing process thereof but the purpose of adding the spherical glassy material cannot be accomplished. The reasons for using the spherical glassy material are as follows.

The components making up the synthetic resin composition differ in specific gravity from one another. The flow merge line can be removed or reduced using the difference in specific gravity. The spherical glassy material is used for this purpose. The injection molding referred to herein is a process in which a molten resin is introduced into the cavity of molds conforming in shape to a desired product and then the molten resin is cooled to obtain a final product. In this process, gaseous low-molecular-weight materials exist in the foremost portion of the tip end of the molten resin, i.e., at the flow front end of the molten resin. Using the phenomenon that the materials having a low specific density are gathered at the flow front end of the molten resin, the spherical glassy material 300 low in specific gravity than other components of the resin composition is caused to gather in the flow merge line as illustrated in FIG. 2, thereby urging the plate-like metallic pigment 100 to be oriented in other directions than the vertical direction. Such effect is less conspicuous if the specific gravity of the spherical glassy material grows higher and the size thereof becomes smaller. In this case, it becomes difficult to remove the flow merge line. For the reasons stated above, it is preferred that the specific gravity of the spherical glassy material be equal to or smaller than 0.6 g/cc.

While the addition amount of the spherical glassy material varies with the specific gravity thereof, it is preferable to add 1 to 50 parts by weight of the spherical glassy material. If the addition amount of the spherical glassy material is less than 1 part by weight, the effect of removing or reducing the flow merge line becomes less remarkable. If the addition amount of the spherical glassy material is greater than 50 parts by weight, the light reflected from the metallic pigment within a product is heavily refracted by the excessive amount of the spherical glassy material, thereby reducing the brightness of a product. This sharply deteriorates the metal texture and generates color variations.

A dispersant is used to disperse the ultrafine glass filament and the spherical glassy material. The dispersant may be used in combination with a surfactant and is selected from the group consisting of mineral oil, stearic acid, ethylene-bis-stearamide, zinc stearate, ethylene vinyl acetate and a mixture thereof. The dispersant may be added in an amount of 1 to 10 parts by weight based on 100 parts by weight of the ultrafine glass filaments and the spherical glassy material. In other words, the weight ratio of the ultrafine glass filaments and the spherical glassy material to the dispersant may be 1:0.01 to 1:0.1. If the addition amount of the dispersant exceeds 10 parts by weight, a problem may be posed in that the dispersant is thermally decomposed in the injection molding process, thereby generating defects on the surface of a product.

In the synthetic resin composition according to the present invention, an internal lubricant is added in order to uniformly disperse the ultrafine glass filaments in the thermoplastic resin and to activate the interfaces between the thermoplastic resin and the plate-like metallic pigment. The internal lubricant may be selected the group consisting of mineral oil, stearic acid, ethylene-bis-stearamide, zinc stearate, ethylene vinyl acetate and a mixture thereof. The internal lubricant may be added in an amount of 0.1 to 10 parts by weight based on 100 parts by weight of the thermoplastic resin. If the addition amount of the internal lubricant exceeds 10 parts by weight, a problem may be posed in that the internal lubricant is thermally decomposed in the injection molding process, thereby generating defects on the surface of a molded article.

In the synthetic resin composition according to the present invention, for the sake of obtaining different colors, an organic or inorganic color pigment may be further added in an amount of 0.1 to 10 parts by weight based on 100 parts by weight of the thermoplastic resin. The organic or inorganic color pigment is not particularly limited but may be pigments or dyes well-known in the art. The organic or inorganic color pigment may preferably be selected from the group consisting of titanium dioxide, carbon black, cyanate-based compounds and a mixture thereof. If the addition amount of the organic or inorganic color pigment exceeds 10 parts by weight, the molded article becomes opaque and, therefore, the plate-like metallic pigment need to be further added. This leads to an increased cost and reduced impact strength. When producing a metal-texture resin molded article, a single-axis extruder is used in usual cases. In case of using a double-axis extruder, screws are designed in such a way as to minimize the number of kneading blocks where pulverizing and mixing are carried out. This is to reduce severance of the ultrafine glass filaments and breakage of the spherical glassy material.

Description will now be made on a method of injection-molding a metal-texture resin molded article using the synthetic resin composition set forth above. The injection molding method for producing a metal-texture resin molded article according to the present invention includes the steps of: melting the synthetic resin composition set forth above (step S10); providing a mold having a cavity surface for defining a cavity (step S20); heating the cavity surface of the mold to a temperature equal to or higher than a melting temperature of the synthetic resin composition (step S30); injecting the molten synthetic resin composition into the cavity (step S40); cooling the mold to solidify the molten synthetic resin composition filled in the cavity (step S50); and removing the solidified synthetic resin composition from the mold (step S60).

One of the most characteristic steps in the injection molding method is the step of heating the cavity surface of the mold to a temperature equal to or higher than a melting temperature of the synthetic resin composition. Unless the cavity surface of the mold is heated to a specified temperature or more, the plate-like metallic pigment, the ultrafine glass filaments and the spherical glassy material contained in the synthetic resin composition are exposed on the surfaces of the molded article, consequently making the outward appearance of the molded article rough and uneven. It is therefore necessary to heat the cavity surface of the mold to a specified temperature or more.

Many different methods can be used to rapidly and uniformly heat the cavity surface of the mold to a temperature equal to or higher than a melting temperature of the synthetic resin composition. An injection-molding mold device including separable molds will now be described as one example of the devices for rapidly and uniformly heating the cavity surface of the mold to a temperature equal to or higher than a melting temperature of the synthetic resin composition. In case of using a typical mold device, it is difficult to rapidly heat the cavity surface of the mold. However, use of a mold device including separable molds makes it possible to rapidly and uniformly heat the cavity surfaces of the molds. The mold device including separable molds is designed to include an independent middle mold having a cavity surface or a core surface, which can be heated before injection and can be cooled simultaneously with the injection. This makes it possible to shorten the cycle time. An electric heater is arranged within the middle mold. The middle mold has a reduced thickness and, therefore, can be heated to a desired temperature within a short period of time. Upon injecting the synthetic resin composition, the electric power supplied to the middle mold is cut off. At the same time the middle mold is brought into contact with a core mold support plate having a cooler installed therein and is cooled rapidly. The cavity surface of the mold is rapidly cooled at a speed of 200 to 400° C./min to a temperature equal to or lowers than a crystallizing temperature (Tc) of the synthetic resin composition.

Now, the mold device including separable molds and the injection molding method using the mold device will be described in detail with reference to FIGS. 3 and 4.

Figure 3:
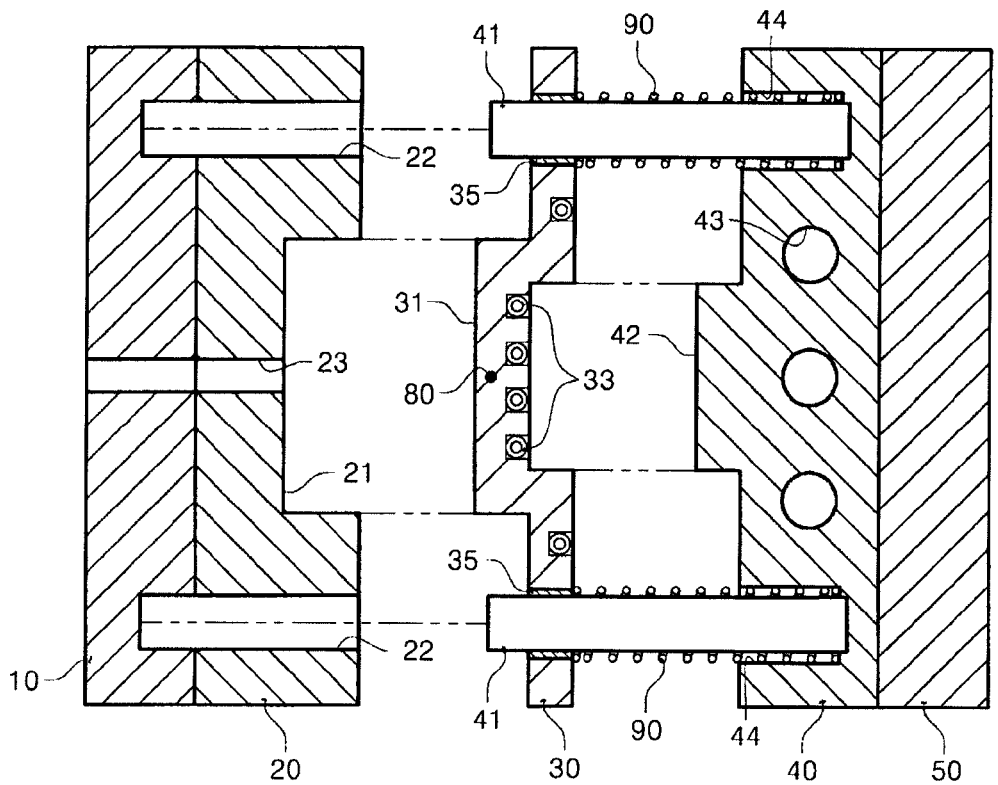
FIG. 3 is a schematic view showing separable molds kept opened, which are used in an injection molding method for producing a metal-texture resin molded article according to one embodiment of the present invention.

FIG. 3 is a schematic view showing the separable molds of the mold device kept opened, which are used in the injection molding method for producing a metal-texture resin molded article according to one embodiment of the present invention. Referring to FIG. 3, the mold device includes a cavity mold 20 fixed to an injection molding machine (not shown), a middle core mold 30 guided by guide pins 41 to make sliding movement toward and away from the cavity mold 20, a core mold fixing plate 50 movably installed in the injection molding machine and a core mold support plate 40 fixed to the core mold fixing plate 50, the guide pins 41 inserted into the bushes 35 of the middle core mold 30 and fixed to the core mold support plate 40. The cavity mold 20 has a cavity surface 21 and an injection path 23 through which a molten synthetic resin composition is injected into the cavity mold 20. The cavity mold 20 has guide holes 22 into which the guide pins 41 are inserted. The middle core mold 30 has a core surface 31 facing the cavity surface 21 of the cavity mold 20. The core surface 31 and the cavity surface 21 cooperate with each other to define a cavity C into which a molten synthetic resin composition is injected. For the purpose of easier heating and cooling, the middle core mold 30 is formed into a plate-like shape to have a thickness smaller than the thickness of the core mold support plate 40. The middle core mold 30 is separated from a conventional core mold.

Figure 4:
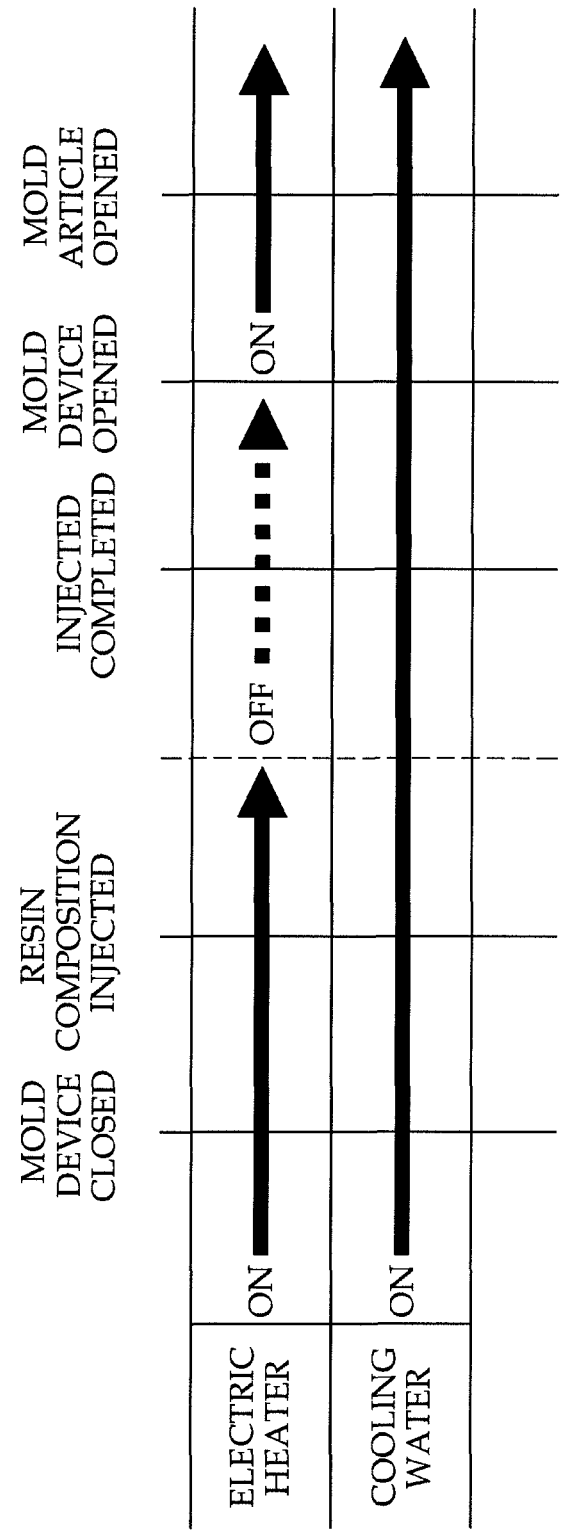
FIG. 4 is a flowchart illustrating an injection molding method using the molds shown in FIG. 3.

FIG. 4 is a flowchart illustrating the injection molding method using the mold device shown in FIG. 3. Referring to FIG. 4, the injection molding method is performed as follows. In a state that the mold device is installed in the injection molding device, an electric current is supplied to an electric heater 33 to thereby heat the middle core mold 30 to a temperature equal to or higher than a melting temperature of the synthetic resin composition. Since the middle core mold 30 has a reduced thickness, it is possible to heat the middle core mold 30 to a desired temperature within a short period of time. At the same time, cooling water is caused to flow through the cooling water pipes 43 of the core mold support plate 40, thereby cooling the core mold support plate 40 to a temperature suitable for cooling the middle core mold 30. If the middle core mold 30 and the core mold support plate 40 reach a specified temperature, the core mold fixing plate 50 is moved to the left in FIG. 3 (toward the cavity mold 20), thereby bringing the cavity mold 20, the middle core mold 30 and the core mold support plate 40 into contact with one another (the mold device is closed).

Next, a molten synthetic resin composition is injected into the cavity C defined between the cavity mold 20 and the middle core mold 30. The electric power supplied to the electric heater 33 is cut off during the course of injection or at the end of injection. Upon cutting off the electric power, the middle core mold 30 is rapidly cooled by the core mold support plate 40 kept in a cold state. The cavity mold 20 making contact with the middle core mold 30 is also rapidly cooled. With this cooling method, it is possible to rapidly reduce the temperature of the resin composition within the cavity at a speed of 200° C./min to 400° C./min. The rapid cooling provides the following advantages. If the synthetic resin composition stays for a long time at a temperature higher than the melting temperature thereof, the thermoplastic resin contained in the resin composition is decomposed to thereby generate a gas. The gas remains within the molded article and the surface thereof, thereby causing detects on the outward appearance of the molded article. In addition, if the synthetic resin composition stays for a long time at an increased temperature, the thermoplastic resin adheres to the molds. For the reasons stated above, it is preferred that the synthetic resin composition be rapidly cooled as soon as the resin composition is shaped into a molded article.

If the injection and solidification of the resin composition is completed, the core mold fixing plate 50 is moved backward (to the right in FIG. 3) so that the guide pins 41 can be removed from the guide holes 22 (the mold device is opened). At this time, the middle core mold 30 is separated from the core mold support plate 40 by the restoring force of coil springs 90 and is no longer cooled. Simultaneously, the electric power is supplied to the electric heater 33 to heat the middle core mold 30. The molded article is taken out from the cavity C. The injection molding process set forth above is performed repeatedly. The method of heating the molds is not limited to the one stated above. Other heating methods may be used as long as the molds can be heated to a temperature higher than the melting point of the synthetic resin composition. For example, the molds can be heated through the use of a gas fuel flame or an inductive current.

Certain experimental examples will now be presented to describe the present invention in more detail. However, the present invention is not limited to these examples.

Example 1

A plate-like aluminum pigment having an average particle size of 30 μm was prepared. 3 parts by weight of the aluminum pigment was mixed with 100 parts by weight of polycarbonate. 10 parts by weight of ultrafine glass filaments were additionally mixed with the polycarbonate to obtain a synthetic resin composition. A mobile phone case was produced by injection-molding the resin composition through a typical injection molding process and not a super-high-temperature mold heating process. The super-high-temperature mold heating process refers to an injection molding method in which the separable molds are rapidly heated to a temperature higher than the melting point of the resin composition and then rapidly cooled as described above. The injection molding conditions are shown in Table 1 below.

TABLE 1

| | |
|---|---|
| Injection Molding Machine | 250-ton machine, a product of KIC, Ltd., Korea |
| Cylinder Temperature (° C.) | 250/290/280/270/250 (nozzle/C4/C3/C2/C1) |
| Injection Pressure (Kg/cm$^2$) | 110/125/125/125/110 (holding pressure/$4^{th}/3^{rd}/2^{nd}/1^{st}$) |
| Injection Speed (%) | 90/90/90/80 ($4^{th}/3^{rd}/2^{nd}/1^{st}$) |
| Resin Drying Condition | 120° C./3 hr |
| Mold Temperature (Hot Water Used) | 90° C. when injected and 60° C. when taken out |
| Cycle Time | 28 seconds |

Example 2

A plate-like aluminum pigment having an average particle size of 30 μm was prepared. 3 parts by weight of the aluminum pigment was mixed with 100 parts by weight of polycarbonate. 10 parts by weight of ultrafine glass filaments and 5 parts by weight of spherical glassy material were additionally mixed with the polycarbonate to obtain a synthetic resin composition. A mobile phone case was produced by injection-molding the resin composition through a typical injection molding process and not a super-high-temperature mold heating process. Other experimental conditions remain the same as those of Example 1.

Example 3

A plate-like aluminum pigment having an average particle size of 30 μm was prepared. 3 parts by weight of the aluminum pigment was mixed with 100 parts by weight of polycarbonate to obtain a synthetic resin composition. A mobile phone case was produced by injection-molding the resin composition through a typical injection molding process and not a super-high-temperature mold heating process. Other experimental conditions remain the same as those of Example 1.

Example 4

A mobile phone case was produced in the same method as in Example 1, except that the cavity surfaces of the molds are rapidly heated to 250° C. through a super-high-temperature mold heating process and not a typical injection molding process and then rapidly cooled to a takeout temperature of 60° C. The injection molding conditions are shown in Table 2 below.

TABLE 2

| | |
|---|---|
| Injection Molding Machine | 250-ton machine, a product of KIC, Ltd., Korea |
| Cylinder Temperature (° C.) | 250/290/280/270/250 (nozzle/C4/C3/C2/C1) |
| Injection Pressure (Kg/cm²) | 110/125/125/125/110 (holding pressure/4$^{th}$/3$^{rd}$/2$^{nd}$/1$^{st}$) |
| Injection Speed (%) | 90/90/90/80 (4$^{th}$/3$^{rd}$/2$^{nd}$/1$^{st}$) |
| Resin Drying Condition | 120° C./3 hr |
| Mold Temperature (Super-High-Temperature) | 250° C. when injected and 60° C. when taken out |
| Cycle Time | 28 seconds |

Example 5

A mobile phone case was produced in the same method as in Example 2, except that the cavity surfaces of the molds are rapidly heated to 250° C. through a super-high-temperature mold heating process and not a typical injection molding process and then rapidly cooled to a takeout temperature of 60° C. Other injection molding conditions remain the same as those of Example 4.

As for the mobile phone cases obtained in Examples 1 through 5, the whiteness, the opacity, the state of a flow merge line and the flow mark color variation were measured and shown in Table 3. In this regard, the whiteness was measured by a colorimeter of Minolta Co., Ltd., Japan (assuming that the whiteness of the plate-like aluminum pigment is 100, a highest level). The opacity was measured by a haze-meter of Nihon Denshoku Industries Co., Ltd., Japan (assuming that the perfect transparency is 100). The state of a flow merge line was measured by observing the color difference in the flow merge line with naked eyes. The flow mark color variation was measured by observing, with naked eyes, the difference in metal color in the portions of the molded article having a thickness deviation.

TABLE 3

| | Whiteness | Opacity | Flow Merge Line | Flow Mark | Article Surface |
|---|---|---|---|---|---|
| Example 1 | 60 | 50 | minute | minute | Pigment, etc. protruding |
| Example 2 | 65 | 50 | none | none | Pigment, etc. protruding |
| Example 3 | 100 | 100 | vivid | vivid | Pigment protruding |
| Example 4 | 90 | 90 | minute | minute | perfect |
| Example 5 | 100 | 100 | none | none | perfect |

In case of Examples 1 and 2, the flow merge line and the flow mark are less conspicuous, but the plate-like aluminum pigment, the ultrafine glass filaments and the spherical glassy material protrude on the surface of the molded article, thereby reducing the whiteness and the opacity.

In case of Example 3, the plate-like aluminum pigment is not arranged horizontally but arranged perpendicularly to the major surfaces of the molded article in the vicinity of the flow merge line. Thus the color difference and the flow merge line appear vividly. The light is unevenly reflected by the aluminum pigment in the vicinity of the flow merge line. The uneven color is vividly observed by naked eyes. Moreover, the flow mark color variation is vividly observed.

In case of Example 4, the molded article shows superior properties as a whole. Due to the absence of the spherical glassy material, however, the flow merge line and the flow mark are more conspicuous than in Example 5. The whiteness and the opacity are also superior as a whole but inferior to those of Example 5.

In case of Example 5, a surface layer having a thickness of 0.1 to 0.3 mm is formed in the molded article. The plate-like aluminum pigment, the ultrafine glass filaments and the spherical glassy material are arranged inward of the surface layer, making the surface of the molded article perfect. As a result, the whiteness and the opacity are superior. The flow merge line and the flow mark are not observed.

While one preferred embodiment of the invention has been described hereinabove, the present invention is not limited thereto. It is to be understood that various changes and modifications may be made without departing from the scope of the invention defined in the claims.

What is claimed is:

1. An injection molding method of making metal-texture resin molded article, the method comprising:
preparing a synthetic resin composition comprising 100 parts by weight of a thermoplastic resin, 0.1 to 10 parts by weight of a plate-like metallic pigment, and 1 to 50 parts by weight of an ultrafine filamentary material;
melting the synthetic resin composition;
providing a mold having a cavity;
heating the mold to a temperature higher than a melting point of the synthetic resin composition;
injecting the molten synthetic resin composition into the cavity of the mold;
cooling the mold filled with the synthetic resin composition to solidify the synthetic resin composition; and
removing the solidified synthetic resin composition from the mold.

2. The injection molding method of claim 1, wherein the plate-like metallic pigment of the synthetic resin composition has an average particle size of 20 to 200 μm.

3. The injection molding method of claim 1, wherein the synthetic resin composition further comprises 1 to 50 parts by weight of a spherical glassy material with respect to 100 parts by weight of the thermoplastic resin, and the spherical glassy material of the synthetic resin composition has an average particle size of 20 to 200 μm.

4. The injection molding method of claim 1, wherein the ultrafine filamentary material of the synthetic resin composition has an average diameter of 1 to 200 μm and an average length of 3 to 50 mm.

5. The injection molding method of claim 1, wherein the synthetic resin composition further comprises 0.1 to 10 parts by weight of an internal lubricant.

6. The injection molding method of claim 1, wherein the composition further comprises 1 to 50 parts by weight of a spherical glassy material with respect to 100 parts by weight of the thermoplastic resin, and the spherical glassy material of the synthetic resin composition has a specific gravity of 0.1 to 0.6 g/cc.

7. The injection molding method of claim 1, wherein the ultrafine filamentary material of the synthetic resin composition comprises silicon dioxide.

8. The injection molding method of claim 1, wherein the thermoplastic resin of the synthetic resin composition is selected from the group consisting of a polycarbonate resin, a polyethylene terephthalate resin, a polypropylene resin, a polyethylene resin, an acrylonitrile butadiene styrene resin, an acetal resin, a nylon resin, an EPDM (Ethylene Propylene Diene Monomer) resin, a styrene resin, a polyethylene ether ketone resin, a polyacrylate resin, a methyl methacrylate butadiene styrene resin, an acrylonitrile styrene resin, a methyl methacrylate resin and a mixture thereof.

9. The injection molding method of claim 1, wherein the synthetic resin composition further comprises 1 to 50 parts by weight of a spherical glassy material with respect to 100 parts by weight of the thermoplastic resin, and 1 to 10 parts by weight of a dispersant with respect to 100 parts by weight of a mixture of the ultrafine filamentary material and the spherical glassy material.

10. The injection molding method of claim 9, wherein the dispersant is selected from the group consisting of mineral oil, stearic acid, ethylene-bis-stearamide, zinc stearate, ethylene vinyl acetate and a mixture thereof.

11. The injection molding method of claim 1, wherein the synthetic resin composition further comprises 0.1 to 10 parts by weight of an organic or inorganic color pigment with respect to 100 parts by weight of the thermoplastic resin.

12. The injection molding method of claim 1, wherein, in the cooling step, a cavity surface of the mold is rapidly cooled at a speed of 200 to 400° C./min to a temperature equal to or lower than a crystallizing temperature of the synthetic resin composition.

* * * * *